Aug. 6, 1929. J. T. ZAK 1,723,456
ANGLE MEASURING INSTRUMENT
Filed Nov. 1, 1928
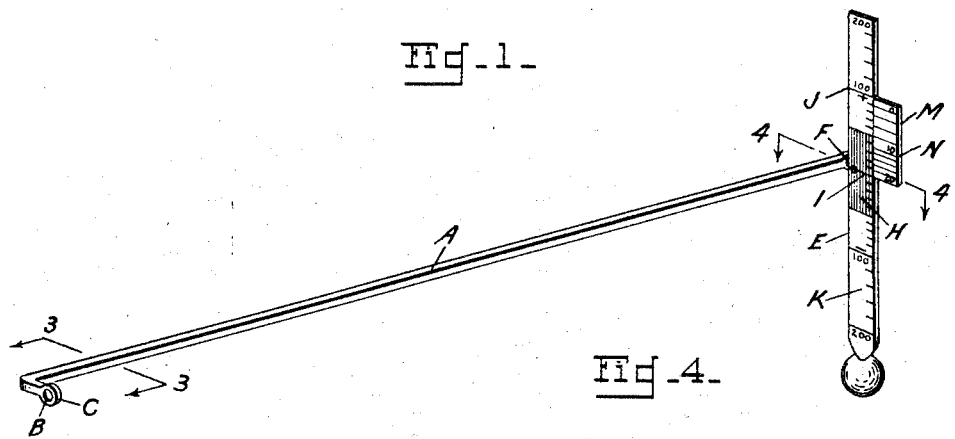
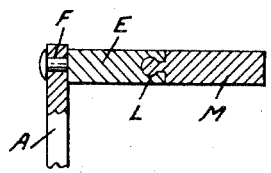
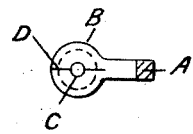
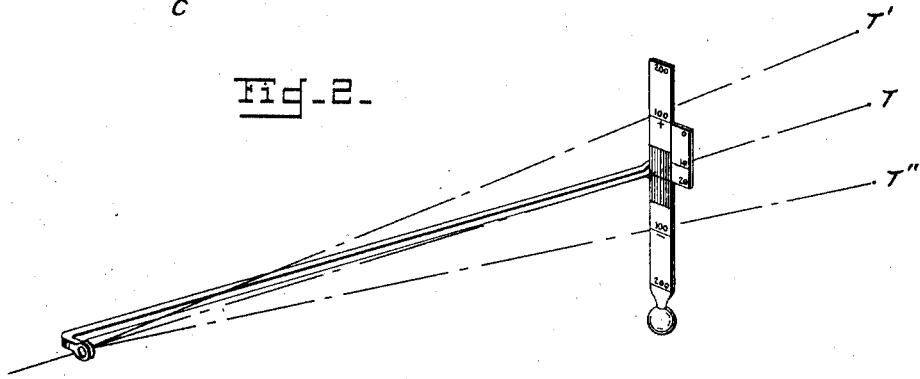
Inventor
Joseph T. Zak
By W. N. Roach
Attorney Patented Aug. 6, 1929.

1,723,456

UNITED STATES PATENT OFFICE.

JOSEPH T. ZAK, OF MILWAUKEE, WISCONSIN.

ANGLE-MEASURING INSTRUMENT.

Application filed November 1, 1928. Serial No. 316,510.

(GRANTED UNDER THE ACT OF MARCH 3, 1883, AS AMENDED APRIL 30, 1928; 370 O. G. 757.)

The invention described herein may be manufactured and used by or for the Government for governmental purposes, without the payment to me of any royalty thereon.

This invention relates to angle measuring instrument and, more particularly, it has reference to an instrument for determining the angle of quadrant elevation.

The principal object of the invention is to provide an instrument of the character described which will be especially adapted for determining accurate data for use in gunnery and which will be immediately accessible under the conditions of field service. The instrument is distinguished mainly by a novel method of levelling and of combining values of angle of site and range to ascertain the angle of quadrant elevation.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a perspective view of an instrument constructed according to the invention;

Fig. 2 is a similar view illustrating the method of employing the instrument; and Figs. 3 and 4 are detail sectional views on the respective lines of Fig. 1.

Referring to the drawings by characters of reference:

The instrument comprises a bar A having secured to one end a rear sight B which is formed with a peep hole C and has a reference mark D on its forward face.

On the other end of the bar a front sight E is centrally pivoted as at F and the lower end of the sight carries a weight G so that it will always assume a vertical position, irrespective of the inclination of the bar A. On the central portion of the front sight there is a mirror H on which is inscribed a horizontal reference line I, lying in the same horizontal plane as the axis of the pivot F. From the line I as zero, a plus mil scale J is inscribed on the upper portion of the front sight and a minus mil scale K is inscribed on the lower portion.

The outer edge of the front sight is grooved as at L to slidably mount a leaf M inscribed with an inverted range scale N, the graduations being determined according to angles of departure of the bullet for a particular weapon at specified ranges.

The horizontal or level position of the instrument is established when the observer, upon looking through the peep sight can see the reflection of the reference mark D which is on the rear sight in coincidence with the horizontal line I on the mirror.

In employing the instrument to determine the quadrant elevation, the observer, after leveling it, sights on the target and notes the division on the mil scale which is intersected by the line of sight to the target. This reading will be an indication of the angle of site to the target. In Fig. 2, where the point T represents the target and the line of sight to the target intersects the zero on the mil scale, then the target is in the same plane as the bar A and the angle of site is zero.

The range to the target, having been determined by an auxiliary instrument, or by a provision therefor incorporated on the bar A, is applied by moving the inverted sight leaf M until the determined range registers with the zero on the mil scale. Assuming the range to be 2,000 yards, the point of registration of the line representing zero range with the mil scale will give the angle of departure for 2,000 yards, in this case being plus 100 mils. As there is no angle of site, the quadrant elevation will also be 100 mils.

When the target is at T' and the line of sight indicates that the angle of site is plus 100 mils, the sight leaf M is then raised until the 2,000 graduation on the range scale registers with plus 100 mils. The zero on the range scale will then register with the plus 200 mil mark which will be the value of the angle of quadrant elevation, being the algebraic sum of the angle of site and angle of elevation.

When the target is at the position designated by T'' at a depression angle of 100 mils, the range scale on being lowered until the 2,000 yard graduation registers with the minus 100 mil graduation, will give a reading of zero quadrant elevation.

I claim:

1. An angle measuring instrument comprising a support, a rear sight bearing a reference mark on its forward face secured to one end of the support, a front sight bearing a plus and minus angle of site scale pivoted to the other end of the support of the line of the zero of the scale, a weight on the lower end of the front sight, a reflecting surface on the front sight bearing a reference at the zero of the scale and a leaf bearing an inverted range scale slidably mounted on the front sight.

2. An angle measuring instrument comprising a support, a rear sight on one end of the support, a front sight bearing an angle of site scale pivoted to the other end of the support on the line of the zero of the scale, a weight on the lower end of the front sight, a reflecting surface on the front sight for imaging the rear sight and a leaf bearing an inverted range scale slidably mounted on the front sight.

JOSEPH T. ZAK.